United States Patent [19]

Nozi

[11] 4,020,456
[45] Apr. 26, 1977

[54] TIRE AIR PRESSURE SYSTEM FOR AUTOMOTIVE VEHICLES

[76] Inventor: Akio Nozi, 2-7-13, Motoasakusa, Taito, Tokyo, Japan

[22] Filed: Sept. 18, 1975

[21] Appl. No.: 614,597

Related U.S. Application Data

[63] Continuation of Ser. No. 447,045, Feb. 28, 1974, abandoned.

[30] Foreign Application Priority Data

July 4, 1973 Japan .............................. 48-74866

[52] U.S. Cl. ............................... 340/58; 200/61.25
[51] Int. Cl.² ........................................ B60C 23/04
[58] Field of Search ............... 340/52 F, 58, 60, 62, 340/240, 263, 53; 307/10 R; 200/61.22, 61.25; 180/105 E; 73/146.5, 146.8, 509, 495

[56] References Cited

UNITED STATES PATENTS

| 3,526,873 | 9/1970 | Burt | 340/58 |
| 3,715,719 | 2/1973 | Sugiyama | 340/58 |

Primary Examiner—John W. Caldwell
Assistant Examiner—Joseph E. Nowicki

[57] ABSTRACT

A device including a detector means for the wheels of a vehicle to detect a reduction in the tire air pressure below a specified level, alarm holding circuits which may be operated under the control of the detector to energize an alarm device and hold it in the energized state, and a reset signal producing circuit operable at the vehicle speeds exceeding a predetermined level for intermittently producing a signal to reset the alarm holding circuits. The device informs the driver of any unusual reduction in tire air pressure and of the range of vehicle speed in which it is dangerous to drive with such reduced tire air pressure.

5 Claims, 2 Drawing Figures

TIRE AIR PRESSURE SYSTEM FOR AUTOMOTIVE VEHICLES

This is a continuation application of the applicant's earlier application Ser. No. 447,045, filed Feb. 28, 1974, titled "TIRE AIR PRESSURE SYSTEM FOR AUTOMOTIVE VEHICLES", now abandoned.

BACKGROUND AND SUMMARY OF THE INVENTION

This invention relates to tire air pressure alarm systems for automotive vehicles such as automobiles, designed to detect a reduction in the tire air pressure below a specified level and to warn the driver of the unusual tire state and of the danger involved in driving in such state at high speeds.

In general, driving a vehicle with its tire air pressure reduced below a specified level involves the danger of tire burst resulting from excessive internal friction that might occur in the tire material. Such danger increases with the travelling speed of the vehicle.

In view of this, the present invention has for its object the provision of a novel tire pressure alarm system of the type described which includes an alarm device continuously operable upon the reduction in the tire air pressure below a specified level as long as the vehicle runs at low speed. During high-speed travel of the vehicle, the driver is warned of the unusual reduction in tire air pressure, and at the same time the range of the vehicle speed is indicated at it, is particularly dangerous to drive, thereby to enable him to take appropriate measures to avoid traffic accidents resulting from a possible tire burst.

The above and other objects, features and advantages of the present invention will become apparent from the following description when taken in conjunction with the accompanying drawing, which illustrates a preferred exemplary embodiment of the invention.

DESCRIPTION OF THE PREFERRED EMBODIMENT

Figure 2:
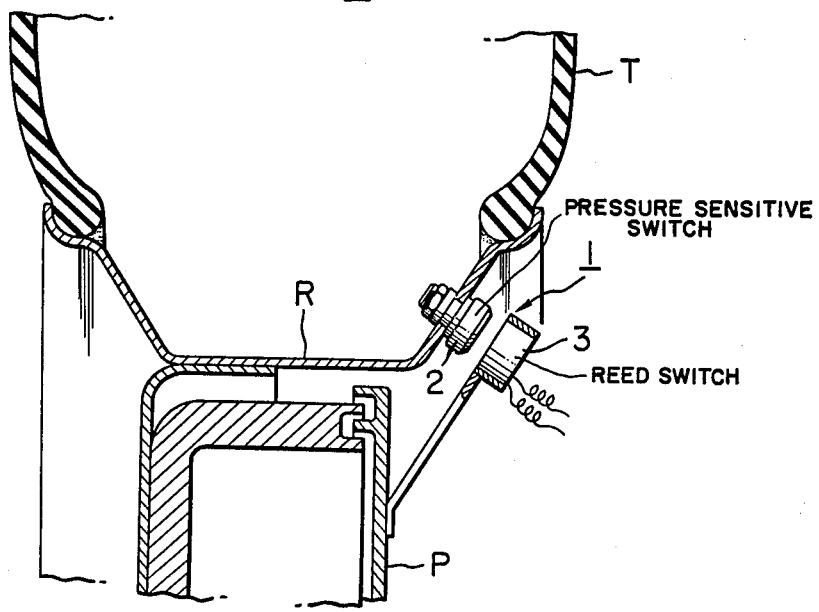
FIG. 2 is a fragmentary radial cross-sectional view of a vehicle wheel portion provided with an air-pressure reduction detector means forming an essential part of the inventive system.

Referring to the drawings, reference numeral 1 generally indicates a number of air pressure reduction detector means provided for at least one of the wheels of a vehicle (four in this example), each including an air-pressure reduction detector 2 and a normally closed reed switch 3 operably associated therewith. As shown in FIG. 2, the detector 2 is mounted on one side of a wheel rim R fitted with a pneumatic tire T, the reed switch 3 being mounted on an adjacent brake panel P or the like, which is supported against rotation on the vehicle body, not shown. It is to be understood that the reed switch 3 is closed at the instant when the detector 2 happens to be positioned opposite thereto in the event that the air pressure in tire T is reduced below a specified level.

Figure 1:
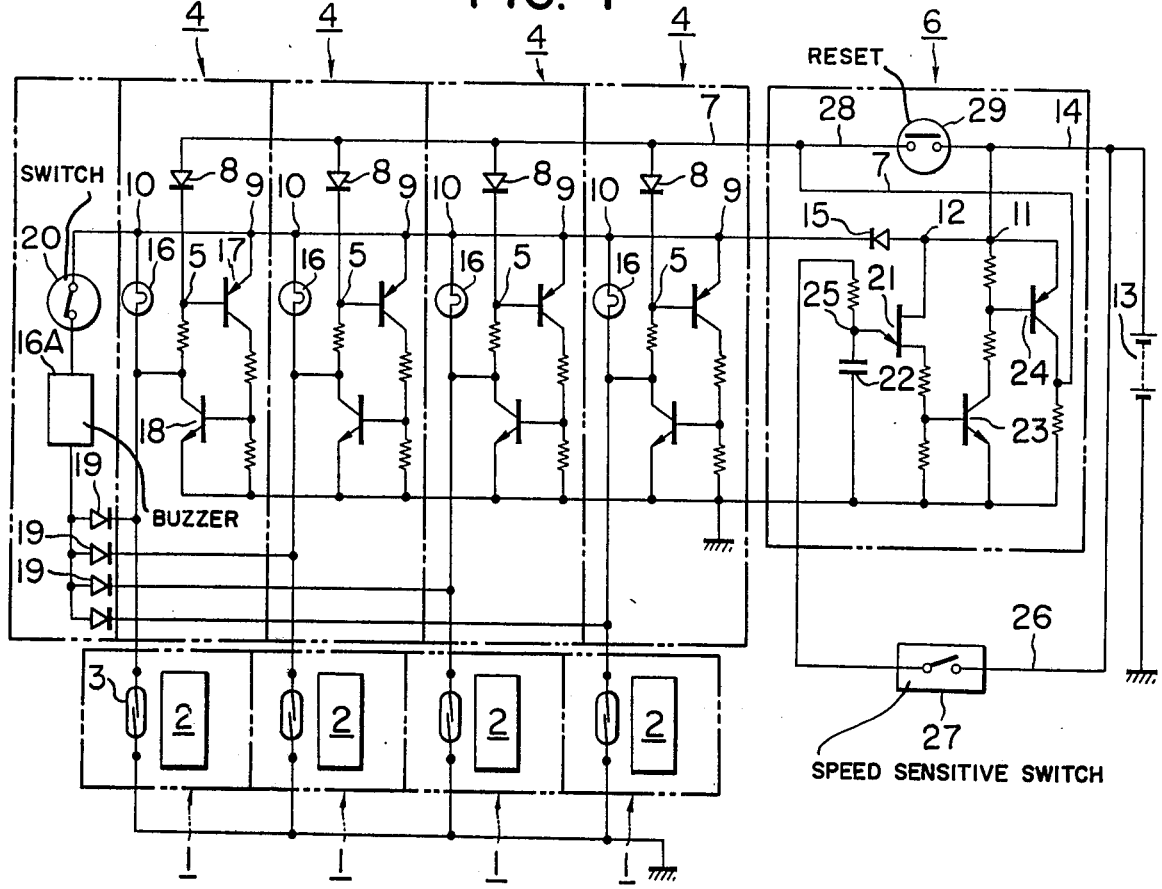
FIG. 1 is a circuit diagram showing an electric circuit arrangement of the tire pressure alarm system embodying the present invention.

Referring now to the circuit of FIG. 1, connected to each respective detector means 1 are separate alarm holding circuits 4 which include respective signal input terminals 5 to which a signal circuit 7, extended from a common reset signal producing circuit 6, is connected by way of respective diodes 8. More will be said about the signal circuit 7 somewhat later. A source circuit 14 including a voltage source 13 is connected to the alarm holding circuits 4 at inputs 9 and 10 and to the reset signal producing circuit 6 at inputs 11 and 12, with a diode 15 inserted between the input 12 of the reset signal producing circuit 6 and the input 9 of the adjacent one of the alarm holding circuits 4.

The alarm holding circuits 4 each include an alarm lamp 16, a PNP type transistor 17 and an NPN type transistor 18 connected with respective polarities as shown. The alarm lamps 16 are connected in parallel to a common buzzer 16A by way of respective diodes 19, with a manually operable switch 20 connected in series with the buzzer 16A, as shown. Obviously, the alarm lamps 16 and buzzer 16A are arranged in the vehicle at a location appropriate to enable the driver to perceive the light or sound thereof without fail, for example, on the instrument panel of the vehicle.

The reset signal producing circuit 6 includes a unijunction transistor 21 (referred to as UJT hereinafter), a capacitor 22, an NPN type transistor 23 and a PNP type transistor 24 connected respectively as shown. Connected to the input terminal 25 of UJT 21 is a signal circuit 26 branching off of the source line 14 and including a speed-sensitive switch 27 adapted to close automatically when the travelling speed of the vehicle exceeds a predetermined level, for example, 50 kilometers per hour.

Again referring to FIG. 1, reference numeral 28 indicates a circuit short-circuiting or shunting the source circuit 14 and the earlier-mentioned signal circuit which includes a manually operable, normally open reset switch 29.

The mechanical aspects of the air-pressure switch device, substantially as shown in FIG. 2, are the subject of applicant's co-pending U.S. patent application Ser. No. 428,906, filed Dec. 26, 1973, issued as U.S. Pat. No. 3,873,787 dated Mar. 25, 1975.

Description will next be made of the operation of the alarm system described above. Assuming that the vehicle is travelling at a speed lower than 50 kilometers per hour, if the leftmost one of the air-pressure reduction detectors 2, as viewed in FIG. 1, detects an unusual reduction in air pressure in the associated tire to close the adjacent reed switch 3, current is directed from the source circuit 14 through the diode 15 to the input terminal 9 of the transistor, 17, in the leftmost alarm holding circuit 4, to furnish the transistor 17 with a base current effective to render it conductive. Hence the transistor 18 is also rendered conductive with a voltage impressed on the base thereof.

In this manner, the two transistors 17 and 18 cooperate to hold the alarm holding circuit 4 in a conductive state notwithstanding the fact that the detector 2 may move away from the reed switch 3, with the rotation of the associated wheel, to cause the reed switch 3 to open. Then the current passing through the diode 15 also flows through the junction 10 to the alarm lamp 16 and the buzzer 16A to energize them in a continuous fashion. The other pole of each lamp 16 is connected to the buzzer 16A through the respective one of the diodes 19, as described earlier.

If the vehicle speed exceeds the exemplary level of 50 kilometers per hour, the speed-sensitive switch 27 is closed to direct current to the input terminal 25 of the UJT 21 in the reset signal producing circuit 6. In this case, though initially the emitter potential of he UJT 21 is so limited as not to produce any emitter current, it is increased as the capacitor 22 is charged and, finally reaching a definite level, starts an emitter current so that the capacitor 22 is rapidly discharged. This renders the transistor 23 and hence the transistor 24 conductive so that a signal output is obtained at the collector of the latter and impressed upon the base of the now conducting transistor 17 as a cut-off signal therefor by way of the signal circuit 7.

As a result, the transistor 17 and hence transistor 18 are reset or rendered non-conductive to de-energize the alarm lamp 16 and the buzzer 16A. Such reset state continues for a second or a fraction thereof until the capacitor 22 is completely discharged and accordingly the UJT 21 is cut off. Apparently, as the capacitor 22 is charged and discharged repeatedly, the cutoff signal is fed to the base of transistor 17 in an intermittent fashion and, when the air-pressure reduction detector 2 again reaches the proximity of the reed switch 3, to close it with the rotation of the wheel, during the period of interruption of the cut-off signal, the transistors 17 and 18 are again rendered conductive to energize the alarm lamp 16 and the buzzer 16A. It will be noted that both the alarm lamp 16 and the buzzer 16A are operated to produce an alarm in an intermittent fashion. Incidentally, if the noise of the buzzer 16A is disturbing to the driver's ear, he can stop it by opening the manual switch 20.

It is to be understood that, even if the driver warned by the alarm takes the necessary steps to repair or inflate the tire, unusually reduced in air pressure, the alarm lamp 16 is kept lit under the circuit holding action of transistors 17 and 18, but the conducting state of the circuit is released to extinguish the lamp 16 if the reset switch 29 is closed momentarily, as then the voltage from the source circuit 14 is impressed upon the base of transistor 17 directly through the line 28 and the signal circuit 7. If, in this case, the buzzer 16A is operating, it is also de-energized upon closing of the reset switch 29.

It will be apparent that, if some other tire T is unusually reduced in associated air-pressure, the air pressure reduction detector means 1 and alarm holding circuit are operated to warn the driver in the same manner as described above.

To summarize, the alarm system of the present invention is so arranged that, if the air pressure in any tire or tires T is reduced below a specified level, the alarm devices such as one or more alarm lamps 16 are put into operation continuously to warn the driver as long as the vehicle runs at a low speed and, as the vehicle speed is raised above a definite level, the mode of operation is changed to an intermittent one. Accordingly, the driver is not only informed of any unusual reduction in tire air pressure during his drive but also of the range of the driving speed within which it is particularly dangerous to drive with the deflated tire or tires, and he can avoid tire burst possible occurring in the high speed range.

While one exemplary preferred embodiment of the present invention has been shown and described, it will be apparent to those skilled in the art that it is not so limited but is susceptible of various changes and modifications without departing from the spirit or from the scope of the invention. Thus, for example, it should be understood that the inventive alarm system does not necessarily have to include the exemplarly four detector means 1 and associated alarm holding circuits 4, the number being at least one, possibly two, or even six, for example for large buses and the like.

What is claimed is:

1. An air-pressure alarm system for automotive vehicles having a number of wheels with pneumatic tires thereon; the system comprising pressure detector means secured to a portion of one of the vehicle wheels fo detecting the reduction in air pressure in the tire of that wheel below a specified level, an alarm signaling circuit, including magnetically operable switch means secured to stationary components of the vehicle in a position opposite to said detector means, to sense the condition of the latter; an alarm device operable when said switch means is closed, thereby signaling to the driver the air-pressure reduction in said wheel below the specified level; alarm holding circuit means activatable in response to the operation of said switch means to continuously energize said alarm device and to keep the same in the energized state; and a circuit for producing a reset signal for intermittently releasing the activated holding circuit means at speeds of the vehicle that exceed a predetermined level.

2. The air-pressure alarm system as defined in claim 1, including at least two of said pressure detector means, two of said magnetically operable switch means and two of said alarm holding circuit means, each of said detector means, switch means and holding circuit means being associated with a respective one of the wheels, wherein each of said holding circuit means includes an individual alarm indicator giving the signal to the driver during the activation of the respective alarm holding circuit means, and wherein said alarm device and the reset-producing circuit is common to all of said detector means, switch means and holding circuit means.

3. The air pressure alarm system as defined in claim 1, wherein said alarm holding circuit means includes a lightable lamp.

4. The air pressure alarm system as defined in claim 1, wherein said magnetically operable switch means is a reed switch.

5. The air pressure alarm system as defined in claim 2, wherein said alarm device is a buzzer.

* * * * *